J. H. LIGHT.
NUT LOCK.
APPLICATION FILED MAY 21, 1910.

986,837.

Patented Mar. 14, 1911.

Witnesses

Inventor
James H Light
By
Attorneys.

UNITED STATES PATENT OFFICE.

JAMES H. LIGHT, OF ANNVILLE, PENNSYLVANIA.

NUT-LOCK.

986,837.   Specification of Letters Patent.   Patented Mar. 14, 1911.

Application filed May 21, 1910. Serial No. 562,700.

*To all whom it may concern:*

Be it known that I, JAMES H. LIGHT, a citizen of the United States, residing at Annville, in the county of Lebanon and State of Pennsylvania, have invented certain new and useful Improvements in Nut-Locks, of which the following is a specification.

This invention comprehends certain new and useful improvements in nut locks of the tangential key type, and the invention has for its primary object a simple, and efficient construction of nut lock of this character embodying a nut which may be easily and cheaply made, and one or more keys for each nut, the keys being also susceptible of being easily manipulated and readily applied and detached whenever desired, and also capable of being repeatedly used.

With these and other objects in view as will more fully appear as the description proceeds, the invention consists in certain constructions, arrangements and combinations of the parts that I shall hereinafter fully describe and claim.

Figure 1:
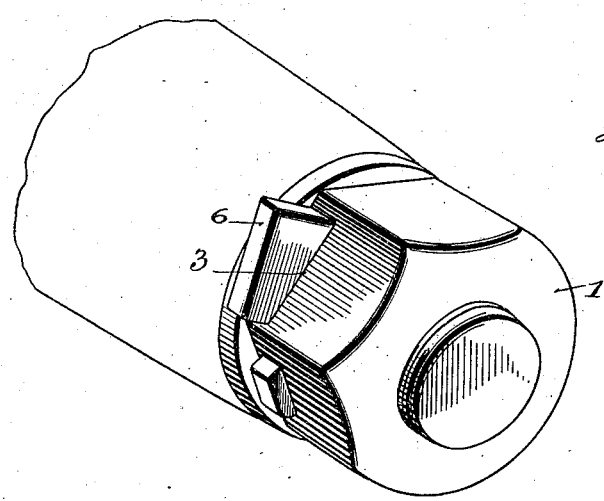
Figure 2:
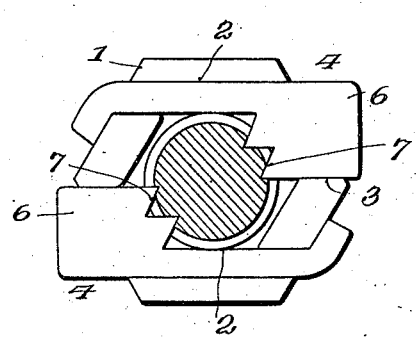
Figure 3:
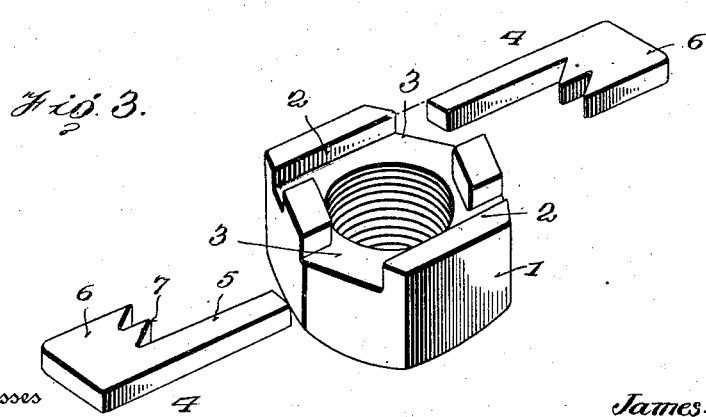

For a full understanding of the invention, reference is to be had to the following description and accompanying drawings in which;

Figure 1 is a perspective view illustrating one application of my improved nut lock; Fig. 2 is a transverse sectional view through the bolt illustrating an inner face view of the nut and the locking keys secured thereto and to the bolt; and, Fig. 3 is a perspective view of the nut, looking at the inner face thereof, together with the keys detached and in juxtaposition to the nut.

Corresponding and like parts are referred to in the following description and indicated in all the views of the accompanying drawings by the same reference characters.

Referring to the drawing, the numeral 1 designates my improved lock nut which may be formed with any desired number of sides, and which is formed in its inner face with one or more tangential recesses, there being two of these recesses in the present instance, designated 2, and both of them opening at the inner face of the nut and extending from one side to the other thereof. Each recess is laterally enlarged at one end as at 3 in the direction of a line drawn through the diameter of the bolt parallel to main tangential portion of the recess.

4 designates the locking keys of which there is one for each recess in the nut. Each key 4 embodies a shank 5 which is preferably of a thickness corresponding to the depth of the recess 2 and of a width to snugly fit said recess and slightly overlap or at least lie entirely flush with the bolt receiving opening of the nut, whereby as the key is driven in, the shank will engage the threads of the bolt. In addition to the shank 5, each locking key 4 embodies a head 6 which is of a width to fit the laterally enlarged end 3 of the recess 2, the said head being formed at its inner edge with undercut teeth 7 designed to be partially embedded in the bolt. Each key is of such a length that after it has been driven into its recess, and the teeth 7 engaged with the bolt, the opposite end of the shank 5 will protrude out of the narrow end of the recess so that such protruding end may be bent in any desired direction over against one of the side faces of the nut, thereby securely locking the key in place. This is illustrated in Figs. 1 and 2.

From the foregoing description in connection with the accompanying drawing, the operation of my improved lock nut will be apparent. After the nut has been screwed up to the required point, preferably against a metal washer as illustrated in Fig. 1, the key or keys are driven into the bolts, the shanks in this operation engaging the threads of the bolt at diametrically opposite points, and the teeth 7 being partially embedded in the bolt at also diametrically opposite points, as best illustrated in Fig. 2. The protruding ends of the shanks are then bent over, and the keys locked in place. As the recesses in which the keys lie are formed in the inner face of the nut, it is obvious that after the keys are withdrawn, the nut may be backed off and removed so as to release the part which the bolt holds and the parts may be again put back in place, owing to the fact that the mutilated portion of the bolt is entirely within the inner face of the nut. Thus the bolt is not spoiled for repeated use.

Having thus described the invention, what is claimed as new is:

In combination with a bolt, a nut screwed thereon, the nut being formed in its inner face with a recess tangentially disposed to its bolt receiving opening and extended from one side of the nut to the other, the recess being laterally enlarged at one end in the direction of an imaginary line drawn through the diameter of the bolt parallel to the main tangential portion of the recess, and a key of a length to project into and through the recess with one end protruding, whereby said end may be bent over against the other side of the nut, the key embodying a shank which is of a width fully equal to the width of the main part of the recess and also embodying a head which is of a width to snugly fit in the laterally enlarged portion of the recess, said head being formed on its inner edge with teeth extending inwardly toward the center of the bolt in a direction radially thereto, and being partially embedded in the bolt.

In testimony whereof, I affix my signature in presence of two witnesses.

JAMES H. LIGHT. [L. S.]

Witnesses:
W. N. WOODSON,
FREDERICK S. STITT.

---

Copies of this patent may be obtained for five cents each, by addressing the "Commissioner of Patents, Washington, D. C."